Patented May 1, 1923.

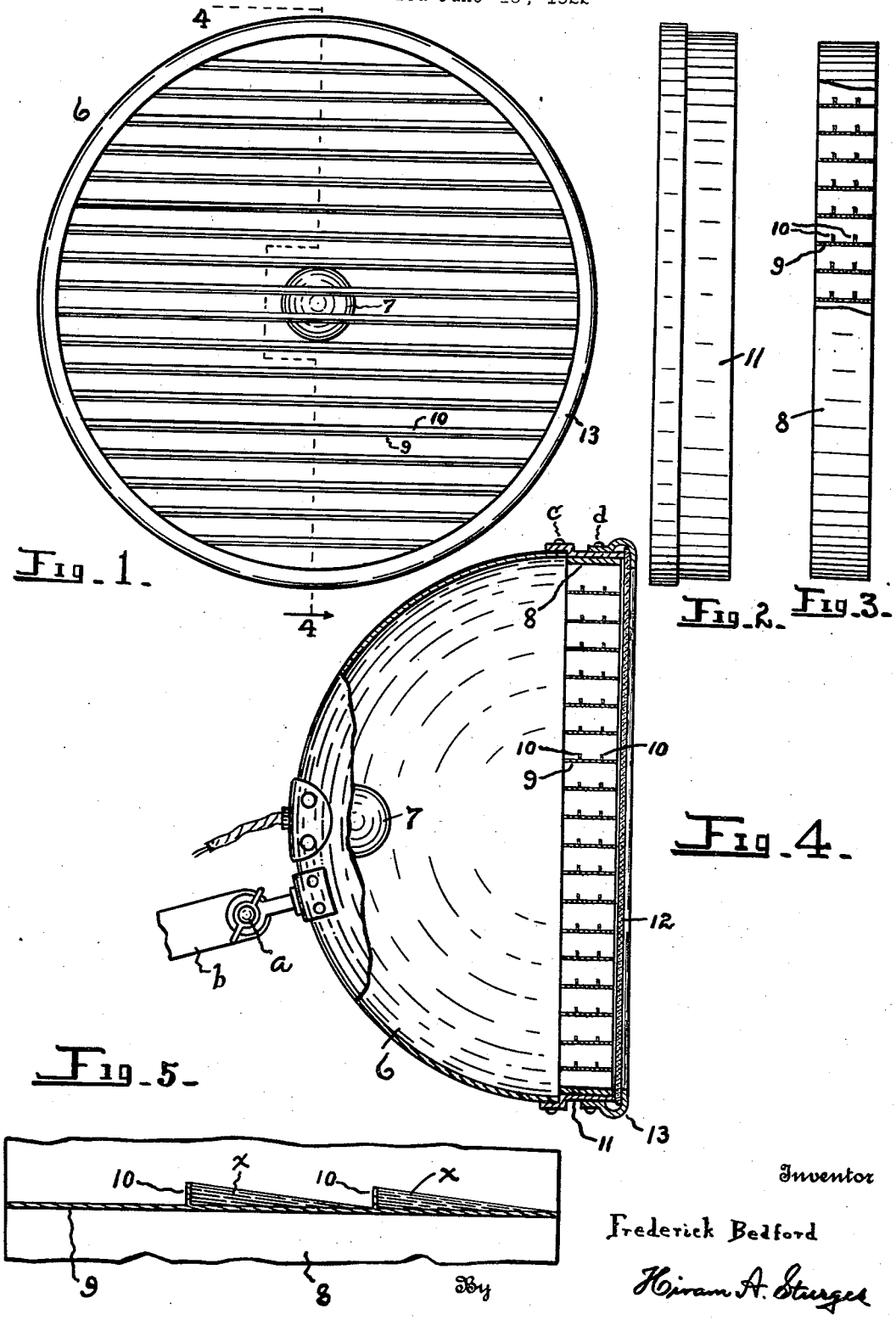

1,453,739

UNITED STATES PATENT OFFICE.

FREDERICK BEDFORD, OF STRATTON, NEBRASKA.

LAMP-REFLECTOR ATTACHMENT.

Application filed June 19, 1922. Serial No. 569,369.

*To all whom it may concern:*

Be it known that I, FREDERICK BEDFORD, a citizen of the United States, residing at Stratton, in the county of Hitchcock and State of Nebraska, have invented certain new and useful Improvements in a Lamp-Reflector Attachment, of which the following is a specification.

This invention relates to a lamp reflector attachment for use on the head lights of motor vehicles, and has for its principal object to provide such a construction that the intense brilliancy of the lamp may be avoided and that the light reflected may be directed toward the ground a limited distance to the front of the vehicle.

The invention is described in connection with the accompanying drawing, wherein,—

Fig. 1 is a front view of a lamp reflector, provided with the attachment. Fig. 2 is a side view of a sleeve. Fig. 3 is a side view of a shutter, a part being in section. Fig. 4 is a broken away, sectional view of a lamp reflector provided with the attachment, the section being on line 4—4 of Fig. 1. Fig. 5 is an enlarged detail showing a part of a shutter to clearly illustrate shadows resulting from the use of projections or ribs which are provided for the blades of the shutter.

It is well known that the intense rays of light from head lights of a moving vehicle often affect the sight and prevent pedestrians or others at the front of a vehicle from correctly estimating distances or distinguishing objects, with the result that injuries and fatalities occur, especially if the vehicle is moving rapidly. By use of the herein described attachment, the ground may be adequately illuminated for a limited distance to the front of a vehicle, but the light directed to any considerable distance will be materially modified so that the objectionable glare or brilliancy will be avoided.

This is accomplished by use of shutters manufactured in various diameters so that they may be readily applied to the reflectors of head lights generally. In the drawing, numeral 6 indicates a reflector provided with a lamp 7 and arranged to be adjusted when swung from its pivotal mounting $a$ from a bracket $b$ carried by a vehicle, the operation of the concavo-convex reflector being to reflect rays of light from its concave surface parallel with its longitudinal axis, rays of light, not reflected, also being directed radially from the lamp, forwardly from the reflector.

The invention therefore relates to a control of light reflected from the concave form or surface of the reflector, and also a control of rays of light which are not reflected but are directed radially from the lamp. For this purpose I provide a shutter of such construction that it may be conveniently mounted on the wall of the reflector. It consists of a band 8 having a plurality of parallel blades 9 provided, longitudinally, with projections or ribs 10, said shutter being enclosed in a sleeve 11 adapted to be secured to the reflector by suitable keepers $c$. Numeral 12 indicates a transparent plate for the front of the reflector, the mounting of said plate being beneath a rim 13 which is secured to the sleeve by suitable keepers $d$.

It will be seen that the attachment thus provided, by use of the keepers $c$, may be readily mounted upon or removed from the wall at the front or open end of the reflector.

The blades 9 are disposed approximately parallel with the longitudinal axis of the reflector, and since they are of attenuated form they will not obstruct the reflected rays of light appreciably, but, as is obvious, the blades will obstruct the rays of light from the lamp which are directed angularly thereto, the degree of obscuration depending upon the width of the blades.

However, in order that a comparatively narrow band may be employed and that the blades may be of limited width, and also that the rays of light may be obscured in such a degree that their objectionable brilliancy will not be noticeable at a distance remote from the front of the head light, I provide the projections or ribs 10, as above mentioned.

These projections or ribs extend longitudinally of the blades, approximately at right-angles thereto, and operate to cast shadows $x$, as shown in Fig. 5 of the drawing. While I have shown two of these ribs disposed on the top of each blade, I may use a greater or lesser number of ribs and, of course, they may be disposed upon the bottom of the blades, or upon both top and bottom of each blade if desired, the effect in operation being the same, except in degree.

The attachment as described is of great advantage since it may be applied conveniently to lamp reflectors generally, and since the shadows obscure the light remote from the front of a vehicle in such a manner that brilliancy is not observable, the light immediately at the front of the vehicle being sufficient and practical for safe management and safe driving.

While I have described construction in detail, I do not wish to be understood as limiting myself in this respect, and changes in form, size, proportion and minor details may be made, said changes being within the scope of the invention, as determined by the claims.

I claim as my invention:

1. The combination with a lamp reflector of concavo-convex form, of horizontal blades disposed in spaced relation in the reflector, said blades being provided inwardly of their longitudinal edges with rectilinear ribs for obstructing rays of light directed from the reflector and lamp.

2. The combination with a lamp reflector, of blades within and disposed horizontally in the reflector and provided inwardly of their longitudinal edges with ribs which project approximately at right angles therefrom for obscuring rays of light directed from the reflector and said lamp.

3. An attachment for the concavo-convex wall of a lamp reflector, comprising a sleeve adapted to engage said wall, a band received by the sleeve, and a plurality of horizontal blades disposed in spaced relation in the band to permit rays of light to be directed therebetween from the reflector, said blades being provided inwardly of their longitudinal edges with ribs for obscuring a part of the directed rays of light from the reflector and lamp.

4. An attachment for the concaved wall of a lamp reflector, comprising, in combination, a sleeve, keepers for securing the sleeve to the wall of the lamp reflector, a circular band within the sleeve, a rim, keepers for securing the rim to the sleeve, a transparent plate at the front of the reflector between said band and rim, a plurality of blades within the band, said blades being provided inwardly of their longitudinal edges with ribs which project angularly therefrom for obscuring certain rays of light from the reflector and said lamp.

5. An attachment for the purposes described comprising, in combination with a concave reflector provided with a lamp, of a plurality of blades disposed horizontally in the reflector, each being provided on its upper side between its longitudinal edges with upset ribs extending approximately parallel therewith.

6. In combination with the concaved wall of a reflector open at its front end, said reflector having a source of light at its focal center, a plurality of blades outwardly of the open end of and connected with the reflector, each blade being provided with ribs inwardly of its longitudinal edges; that part of each blade between its ribs and the concaved wall of the reflector being parallel with the longitudinal axis of said reflector.

In testimony whereof, I have affixed my signature in presence of two witnesses.

FREDERICK BEDFORD.

Witnesses:
F. L. SIEGEL,
JOE MASTERS.